Feb. 25, 1958 R. E. GIBONEY 2,824,360
MACHINE TOOL CONTROL SYSTEM
Filed Sept. 14, 1956 2 Sheets-Sheet 1

INVENTOR
Ray E. Giboney.
BY
ATTORNEY

WITNESSES

United States Patent Office 2,824,360
Patented Feb. 25, 1958

2,824,360

MACHINE TOOL CONTROL SYSTEM

Ray E. Giboney, Williamsville, N. Y., assignor to Westinghouse Electric Corporation, East Pittsburgh, Pa., a corporation of Pennsylvania Application September 14, 1956, Serial No. 609,859

8 Claims. (Cl. 29—208)

This invention relates to control circuits for machine tools and more particularly to circuits for controlling the operation of a cyclically operating machine responsive to the cyclic eneregization and deenergization of a plurality of electromagnetic means.

In the past, it has been common practice to control the operation of machine tools with circuitry including a multiplicity of mechanical relays. Many disadvantages are attendant upon such systems, the most important of which are the requirement for regular preventive maintenance and their susceptibility to dreakdown because of failure of moving parts in the relays. As a result of such breakdowns, serious production delays are inevitable particularly where the machines are utilized in systems on production lines such as are found in the automotive industries. Another disadvantage associated with the prior art control systems is excessive noise which can be a contributing factor to lowered employee morale. It is always desirable to increase the speed of operation of such machines particularly in those applications where the machines are exteremely expensive and even a relatively small increase in speed of operation can mean a substantial saving in capital outlay.

Accordingly, it is one object of this invention to provide a control system for a cyclically operating machine responsive to the cyclic energization and deenergization of control means wherein mechanical moving parts are reduced to a minimum.

Another object is to provide such a control system wherein maintenance problems are minimized.

Still another object is to provide such a control system that is quiet in operation and capable of high production speeds.

Still another object is to provide such a control system utilizing static control elements wherever possible.

Other objects and features of the invention will become apparent upon consideration of the following description thereof when taken in conjunction with the accompanying drawings, wherein:

Fig. 3 is a figure showing the configuration of one of the parts to be assembled; and Fig. 4 is a chart showing the sequence of operation of the various limit switches shown in Fig. 2.

Figure 1:
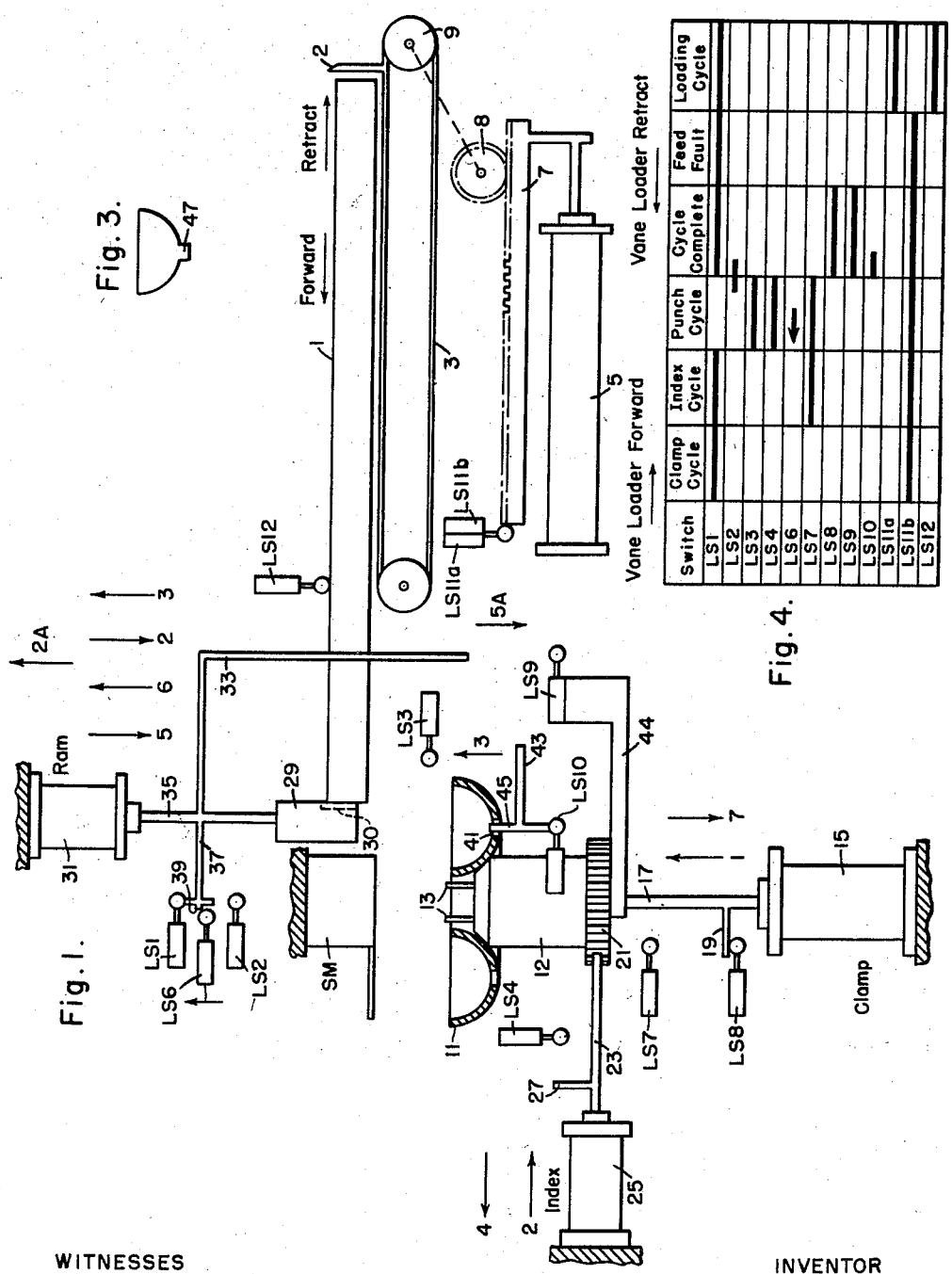
Figure 1 is a schematic representation of a machine tool with which the invention has been found to be particularly adapted.
Figure 2:
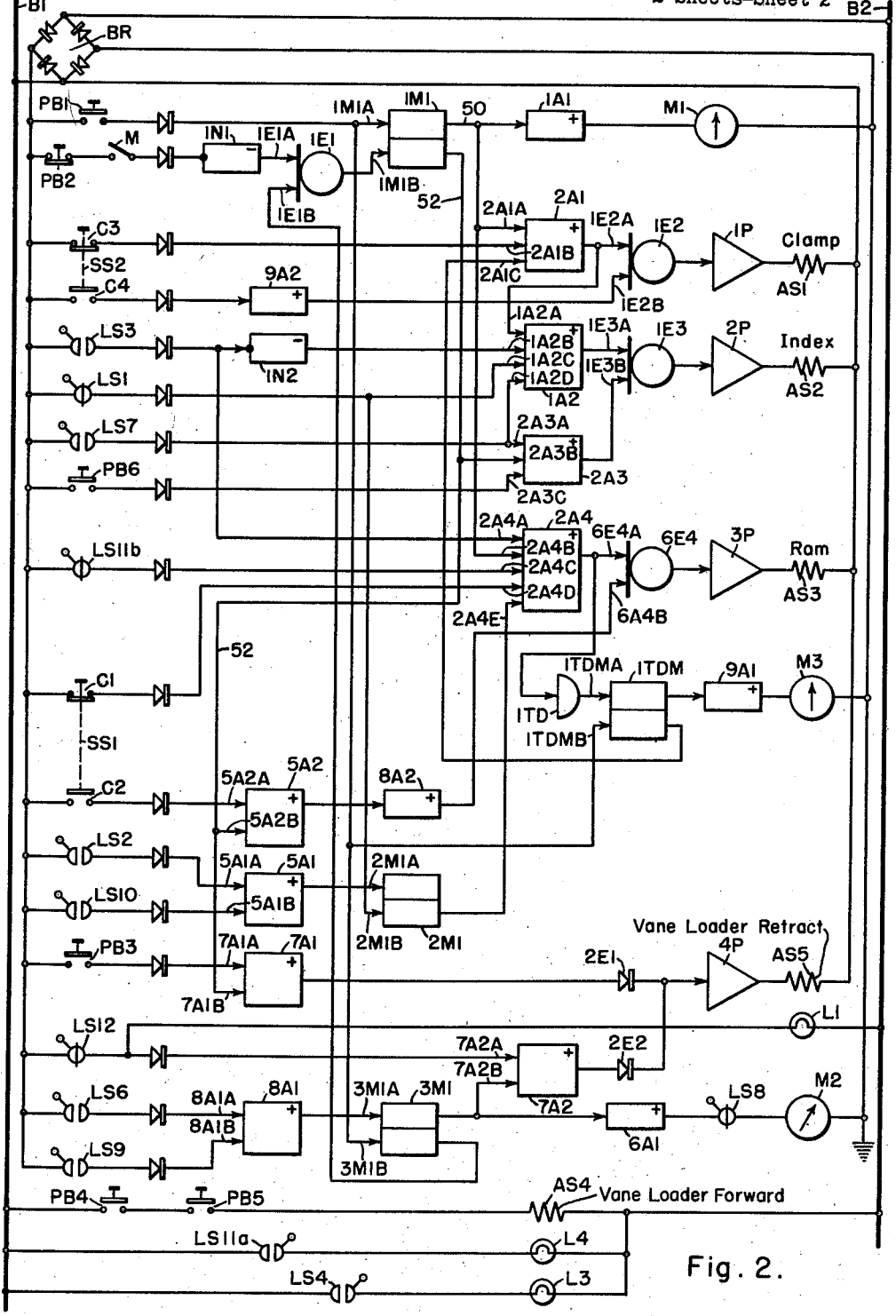
Fig. 2 is an electrical schematic diagram of a preferred embodiment of a control system in accordance with the principles of this invention.

Before proceeding with the description of the invention, it is well to define certain components therein and to briefly describe their operation. The components to which reference is made are static devices that are referred to in the art as And, Or, Not and Memory or Flip-Flop circuits. An And circuit may be defined as a circuit that responds to a plurality of conditions and has an output dependent on such conditions. The relationship is such that the And element transfers from a first to a second output condition or state only if all of the conditions are present. An Or circuit is a circuit that has an output dependent on a plurality of conditions. The relationship is such that the Or element has an output signal if any of the conditions are present. An Or circuit having plural inputs may be designed to supply an output signal when energy is supplied to any of its input circuits. A Not circuit is a circuit which has substantially zero output voltage or current when an input control signal is supplied thereto and an output voltage or current when no input signal is applied thereto.

A Memory or Flip-Flop circuit is a bistable circuit that, in response to a first condition, produces an output signal having a first characteristic that is maintained even though the first condition thereafter is discontinued. The output signal having the first characteristic is terminated and an output signal having a second characteristic is initiated in response to a second condition. In response to reapplication of the first condition, the output signal having the second characteristic will be discontinued and the output signal having the first characteristic will be reinitiated. Thus, the Memory circuit may produce an output voltage or current having a first phase in response to a signal applied to a first control circuit thereof that will continue even though the signal is discontinued. The output voltage or current having the first phase will be discontinued and an output voltage or current having a second phase will be initiated in response to a signal applied to a second control circuit thereof. The output voltage or current having the first phase may be reinitiated and the one having the second phase may be discontinued upon reenergization of the first control circuit.

Suitable And, Or, Not and Memory circuits for practicing this invention may be found in the January 1956 issue of the AIEE conference paper No. CP56–91 by W. G. Evans et al. entitled "Magnetic Logic Circuits for Industrial Control Systems." While other logic circuit elements may be found practical, the devices described in this article have been found to be particularly adapted for use with the invention. The logic circuits described therein make use of the so-called "reset magnetic amplifier." One characteristic of the Memory circuitry described in the above-referenced article is that an output signal of one phase will be produced in response to an "on" signal and in response to an "off" signal an output signal will be produced that is 180° out of time phase relationship with the signal produced in response to the "on" signal.

The apparatus shown in Fig. 1 is for the purpose of injecting vanes into a semitoroidal shell such as are used in fluid couplings of automobile automatic transmission systems. The vanes are initially loaded in a vane loader 1 and are pushed to the left of the vane loaded by means of a pusher arm 2. The pusher arm is actuated by an actuating mechanism or device 5 coupled to a rack 7 which is coupled to pusher arm 2 through mechanical gearing 8 and 9 and an endless belt 3. The toroidal shell 11 is supported by support member 12 at the top of which is a pair of locator pins 13. A clamping type actuating mechanism or device 15 is connected to support means 12 by shaft 17 for the purpose of lifting the toroidal shell to a position whereat vanes may be injected therein. The locator pins 13 fit into holes (not shown) in stop member SM for the purpose of exactly positioning the shell with respect to ram 29. Shaft 17 has a projecting arm 19 for the purpose of actuating limit switches LS7 and LS8, which limit switches are respectively actuated when the shell is in its operative position and its retracted position. For the purpose of indexing or rotating the toroidal shell to successive positions for injection of successive vanes, an indexing mechanism is provided including actuator 25, ratchet wheel 21, ratchet shaft 23 and limit switch trip arm 27. Limit switch trip arm 27 actuates limit switch LS4 at the end of an indexing movement.

A ram 29 having an indentation 30 is actuated by solenoid actuating means 31 and is coupled thereto by means of shaft 35. The ram picks up vanes from the left end of feeder 1 by means of indentation 30 and injects them into the toroidal shell 11. The vanes have a configuration as shown in Fig. 3, the projecting flange 47 being for the purpose of projecting through slot 41 to properly locate it and to actuate limit switch trip means 45.

Attached to connecting shaft 35 are a pair of limit switch trip arms 33 and 37. Trip arm 33 is for the purpose of actuating limit switch LS9 when the toroidal shell 11 is filled with its complement of vanes. Limit switch trip arm 37 is for the purpose of actuating limit switch LS1 when ram 29 is in its retracted position, for actuating limit switch LS2 when the ram has completed its downward movement to inject a vane into toroidal shell 11 and to actuate limit switch LS6 by means of projecting flange 39 as the ram is going through a retracting movement (moving upwardly as shown). Limit switch actuating arm 45 actuates limit switch LS10 when a vane has been fed properly by the assembly including vane loader 1 and pusher arm 2 described above. The actuating member 45 has an arm 43 which closes limit switch LS3 when the toroidal shell is lifted into its operative position, limit switch LS3 being open when the flange 47 completely projects through slot 41.

It is to be understood that many other components may be included in the apparatus described immediately above, this being a prior art apparatus well known to the art and shown here only for the purpose of clarifying the disclosure of the control circuitry to be described below. The operation of the apparatus described immediately above is generally as follows. Assuming that the toroidal shell is in its retracted position so that LS8 is closed, actuation of solenoid actuating means 15 will lift toroidal shell 11 to its operating position closing limit switch LS3. When solenoid actuation means 31 is energized, the ram will be actuated downwardly picking up a vane from vane loader 1 and injecting it into the toroidal shell to close limit switches LS10 and LS2 and to open switch LS1. Energization of solenoid actuating means 25 will rotate the toroidal shell 11 until limit switch LS4 is closed, after which another injecting cycle may be initiated. At the end of an injection cycle, it should be noted that the ram 29 will be retracted to close limit switch LS6 momentarily. Energization of solenoid actuating means 5 will cause pusher arm 2 to move the stack of vanes in vane loader 1 to the left so as to bring the next vane into a position so as to be picked up by ram 29 and injected into the toroidal shell 11. At the end of a predetermined number of injection operations limit switch LS9 will be closed by projecting arm 33 and the actuator 15 will retract toroidal shell 11 into its non-operative or initial position.

In order to facilitate the description of the control circuitry and its operation in connection with the machine tool apparatus generally described above, the operating cycle of the control circuitry will be described. It will be assumed first that selector switch SS1 is in a position such that contact C1 is closed and contact C2 is open and selector switch SS2 is in a position such that contact C3 is closed and contact C4 is open. It will be further assumed that buses B1 and B2 are energized from a suitable source of alternating current. Bridge rectifier BR which is energized by buses B1 and B2 is for the purpose of providing a full-wave rectified output voltage to energize certain of the logic components to be described below. It is to be noted that the logic components are depicted in block form and that no ground connections are shown thereon. It is to be understood that where necessary to complete the input and output circuits, ground connections may be made and that the output of the bridge rectifier may be suitably grounded. This form of representation is known to the art and will not be dealt with further.

The functions of the various solenoid actuators are as follows. Solenoid AS1 is for the purpose of controlling the operation of the actuating device 15 to raise the toroidal shell 11 to its upper position in which position it is clamped. Index solenoid AS2 actuates actuator 25 to index the toroidal shell. Punch solenoid AS3 actuates actuator 31 to drive the ram 29 downwardly. Retract solenoid AS5 is for the purpose of retracting pusher 2 when the cartridge is empty and for reloading. Solenoid AS4 is for the purpose of controlling the operation of actuator 5 to push the vanes in vane loader 1 to the left as shown in Fig. 1.

Since contacts C1 and C3 are closed, bridge rectifier BR will be effective to energize input circuit 2A4D of And circuit 2A4 and input circuit 2A1B of And circuit 2A1. Closing push button PB1 will energize control circuit 1M1A to produce a continuing output signal of a phase arbitrarily designated "a" from output circuit 50 thereof to energize And circuit 1A1 and actuate cycle indicating meter M1, to energize input circuit 2A1A of And circuit 2A1 and to energize input circuit 2A4B of And circuit 2A4. Further, closure of PB1 will energize input circuit 1TDMB of time delay circuit 1TDM to produce an a-phase output signal from time delay circuit 1TDM to energize And input circuit 2A1C. Inasmuch as all of the input circuits of And circuit 2A1 are now energized, an output signal will appear from And circuit 2A1 which will energize clamp solenoid AS1 through Or circuit 1E2 and power amplifier 1P. It should be noted that power amplifiers 1P, 2P, 3P and 4P may be a combination of a reset type amplifier and self-saturating type amplifier such as described in application Serial No. 588,079 for "Punch Press Control" filed May 29, 1956, by R. E. Giboney and G. E. King and assigned to the assignee of the present invention. The toroidal shell will now be lifted to its operating position closing limit switch LS7 and limit switch LS3. Since limit switch LS3 is closed, there will be no output signal from Not circuit 1N2 so that input circuit 1A2B of And circuit 1A2 is not energized, but there will be an input signal to input circuit 2A4A of And circuit 2A4. LS11b is also closed to energize And circuit 2A4C. Since LS1 is closed, Memory circuit input circuit 2M1B will be energized so that an output signal will appear from Memory circuit 2M1 to energize And input circuit 2A4E. All of the input circuits of And circuit 2A4 are now energized and punch solenoid AS3 will be energized through Or circuit 6E4 and power amplifier 3P. The ram 29 will be projected downwardly to inject a vane into the toroidal shell. If the feed mechanism including vane loader 1 has functioned properly, limit switch LS10 will be actuated, and if the flange 47 on the vane projects through slot 41 in the toroidal shell, limit switch LS3 will be open.

Since limit switch LS7 was closed when the toroidal shell was raised to its operating position, input circuit 1A2D of And circuit is energized. At the bottom of the punch, limit switch LS2 will be closed. Since both limit switches LS2 and LS10 are closed, input circuits of 5A1A and 5A1B of And circuit 5A1 are energized to produce an output signal from And circuit 5A1. This will energize input circuit 2A1A to cut off the a-phase output signal from Memory circuit 2M1, thus deenergizing And input circuit 2A4E. The output signal from And circuit 2A4 will disappear deenergizing solenoid AS3 and retracting ram 29. Limit switch LS1 will be closed again to reenergize input circuit 1A2C of And circuit 1A2. Since limit switch LS3 is now open, an output signal will appear from Not circuit 1N2, and all of the input circuits of And circuit 1A2 will be energized to further energize indexing solenoid AS2 through Or circuit 1E3 and power amplifier 2P. Indexing operator 25 will be actuated to close LS4 at the end of the indexing operation. The toroidal shell will be rotated until another slot thereof is under the ram in a position to receive the flange of another vane. The apparatus is now set up for another punching operation inasmuch as limit switch LS3 will now be closed, rotation of the toroidal shell enabling a biasing means (not shown) to project operating bar 45 through slot 41 and moving arm 43 upwardly to close limit switch LS3 and reenergize input circuit 2A4A. After a predetermined number of punching operations have been completed, the toroidal shell will be filled. Support arm 44 will be rotated with each successive indexing operation and when the predetermined number of vanes have been injected into the toroidal shell, limit switch LS9 will be closed by operating arm 33. As each punching operation is completed, limit switch LS6 is momentarily closed by flange 39. On the last retraction of ram 29, closure of limit switch LS6 will produce an output signal from And circuit 8A1 since both of the input circuits 8A1 and 8A1B thereof are now energized. This will energize input circuit 3M1A of Memory circuit 3M1 to energize input circuit 7A2B of And circuit 7A2. At the end of the cycle when the toroidal shell is filled, when vane loader cartridge 1 is empty, limit switch LS12 will be closed so that an output signal will appear from And circuit 7A2 which will be effective to produce an output signal from power amplifier 4P and energize solenoid AS5. Closure of limit switch LS12 will further energize a light L1 which indicates that the vane loader 1 is empty. The $a$-phase output signal from Memory circuit 3M1 energizes phase shifting circuit 6A1 to indicate on meter M2 that a cycle has been completed.

If during the cycle of operation there has been a feed fault so that the downward movement of the ram does not inject a vane into the toroidal shell, the continuing output signal from And circuit 2A4 will, after a predetermined interval, actuate time delay device 1TD which may be a series capacitor-resistor circuit or any similar device for producing an output signal after an input signal thereof has been energized for a given time interval. The output from time delay device 1TD will energize input circuit 1TDMA of time delay Memory circuit 1TDM to cut off the $a$-phase output signal energizing input circuit 2A1C so that solenoid AS1 will be deenergized and the toroidal shell will be retracted to its initial position. At the same time phase reversing circuit 9A1 will be energized and meter M3 will indicate a fault in the feed mechanism.

In the event that manual operation is desired, selector switches SS1 and SS2 are closed to respectively open contacts C1 and C3 and to close contacts C2 and C4. Closure of contact C4 will energize phase reversing device 9A2 (the phase reversing devices are merely And circuits with only one input circuit) to energize actuating solenoid AS1 through Or input circuit 1E2B and power amplifier 1P. The $c$-phase signals ($c$-phase signals being half-wave rectified signals that are 180° out of phase with $a$-phase signals) from Memory circuit 1M1 will be energized upon depression of pushbutton PB2 to produce an output circuit from Not circuit 1N1 and energize input circuit 1M1B of Memory circuit 1M1. Switch M is, of course, closed upon operation of some main switch energizing the system. This will be effective to energize And input circuit 5A2B to produce an output signal from And circuit 5A2 and phase reversing circuit 8A2. The output signal from phase reversing circuit 8A2 will energize punch solenoid AS3 through Or input circuit 6E4B and power amplifier 3P. The $c$-phase output from Memory circuit 1M1 will also energize And input circuit 7A1B depressing pushbutton 3B3 and energizing input circuit 7A1A to produce an output signal from 7A1 and energize the retract solenoid AS5 through Or circuit 2E1 and power amplifier 1P.

Manual indexing is accomplished by depressing pushbutton PB6. The closure of limit switch LS7 will be effective to energize And input circuit 2A3A and the $c$-phase output from Memory circuit 1M1 will energize an input circuit 2A3B, whereby depressing pushbutton PB6 to energize an input circuit 2A3C to produce an output signal from And circuit 2A3 which is effective to energize index solenoid AS2 through Or input circuit 1E3B and power amplifier 2P.

To move the vane loader forward after a manual punching operation, both of pushbuttons PB4 and PB5 should be depressed. This will energize solenoid AS4 to move the pusher arm 2 to the left.

Vane loader retracted solenoid AS5 of actuator 5 and vane loader forward solenoid AS4 of actuator 5 are mounted within the mechanism 5 or may be outside. To manually effect retraction of actuator 5 the retract pushbutton PB3 is depressed and simultaneously therewith either start pushbutton PB1 or stop pushbutton PB2 is depressed. Pushbutton PB3 energizes input circuit 7A1A of And circuit 7A1. Depressing pushbutton PB1 will energize input circuit 7A1B through energization of input circuit 3M1B, Or circuit 1E1, and Memory circuit 1M1, the output lead 52 thereof being energized. Depressing stop pushbutton PB2 will energize input circuit 7A1B through Not circuit 1N1, Or circuit 1E1 and energization of output lead 52 of Memory circuit 1M1. The output of And circuit 7A1 will energize amplifier 4P and thus energize the solenoid AS5. Under automatic operation conditions all of limit switches LS12, LS6 and LS9 must be closed to energize solenoid AS5. Closing limit switch LS12 will energize input circuit 7A2A of And circuit 7A2. Closing both limit switches LS6 and LS9 will produce an output from And circuit 8A1 to energize input circuit 3M1A of Memory circuit 3M1 to thus energize the other input circuit 7A2B of And circuit 7A2. This will also produce an output from amplifier 4P to energize the solenoid AS5.

When there is a fault in the indexing mechanism, LS4 will remain closed to light bulb L3. When the vane loader is in its retracted position LS11a will close to energize bulb L4.

The control circuitry described above has been found to be extremely reliable in operation. Over prior art mechanisms using mechanical relays, it has been found that the operating time required to load a toroidal shell has been substantially reduced typically from 29 seconds to 24 seconds. Maintenance problems have been almost negligible with the control circuitry, only one component failure having occurred in a nine-month period. Typical prior art relay systems have been found to be entirely worn out and require complete replacement after 3 to 4 months of continuous operation. However, the system described showed no indication of deterioration sufficient to warrant replacement of the system noted after over nine months of continuous operation.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. A control system for a cyclically operating machine tool for inserting a predetermined number of work objects in a receptacle, said receptacle being indexable to successive positions so that a reciprocating insertion member can repetitively insert said objects in said receptacle; first electromagnetically actuable means for actuating said insertion member; second electromagnetically actuated means for indexing said receptacle from one to another of said successive positions; first limit switch means adapted to be closed when said first electromagnetically actuated means is in its non-actuated position; second limit switch means adapted to be actuated when said first electromagnetically actuated means is in its actuated position; third limit switch means adapted to be operated when a work object is in said receptacle and over said third switch means; fourth limit switch means adapted to be closed when said second electromagnetically actuated means is in its non-actuated position; fifth limit switch means adapted to be closed when a receptacle supporting member has moved said receptacle to a position suitable for insertion of said work objects; sixth limit switch means adapted to be closed when said predetermined number of work objects have been inserted in said receptacle; first manually actuable means for producing an initiating signal; means including second manually actuable means for producing a stop signal; third electromagnetically actuated means for actuating said receptacle supporting member to move said receptacle to said position suitable for insertion of work objects; fourth electromagnetically actuated means for retracting said receptacle supporting member from said position; first and second bistable means responsive to said initiating signal of said first manually actuated means for generating continuing output signals having a first characteristic, said first bistable means being responsive to said stop signal to generate a continuing output signal having a second characteristic; first circuit means responsive to simultaneous signals from said first and second bistable means for generating an output signal to actuate said third electromagnetically actuated means; second circuit means responsive to simultaneous closure of said first limit switch means, closure of said third limit switch means, closure of said fifth limit switch means to actuate said second electromagnetically actuated means, and appearance of said output signal from said first circuit means; third circuit means responsive to simultaneous closure of said first and third limit switch means, and to appearance of said output signals having said first characteristic from said first bistable means to actuate said first electromagnetically actuable means; fourth circuit means responsive to closure of said second limit switch means for deactuating said first electromagnetically actuable means; time delay means responsive to a continuing output signal from said third circuit means to cut off said continuing output signal from said second bistable means.

2. A control system for a cyclically operating machine tool for inserting a predetermined number of work objects in a receptacle, said receptacle being indexable to successive positions so that a reciprocating insertion member can repetitively insert said objects in said receptacle, each of said objects having a flange adapted to project through slots in said receptacle, each slot corresponding to one of said positions; first electromagnetically actuable means for actuating said insertion member; second electromagnetically actuated means for indexing said receptacle from one to another of said successive positions; first limit switch means adapted to be closed when said first electromagnetically actuated means is in its non-actuated position; second limit switch means adapted to be actuated when said first electromagnetically actuated means is in its actuated position; third limit switch means adapted to be operated when a work object is in said receptacle and over said third switch means; fourth limit switch means adapted to be closed when said second electromagnetically actuated means is in its non-actuated position; fifth limit switch means adapted to be closed when a receptacle supporting member has moved said receptacle to a position suitable for insertion of said work objects; sixth limit switch means adapted to be closed when said predetermined number of work objects have been inserted in said receptacle; seventh limit switch means adapted to be closed when a flange projects through a slot by insertion of a work object in said receptacle; first manually actuable means for producing an initiating signal; means including second manually actuable means for producing a stop signal; third electromagnetically actuated means for actuating said receptacle supporting member to move said receptacle to said position suitable for insertion of work objects; fourth electromagnetically actuated means for retracting said receptacle supporting member from said position; first and second bistable means responsive to said initiating signal of said first manually actuated means for generating continuing output signals having a first characteristic, said first bistable means being responsive to said stop signal to generate a continuing output signal having a second characteristic; first circuit means responsive to simultaneous signals from said first and second bistable means for generating an output signal to actuate said third electromagnetically actuated means; second circuit means responsive to simultaneous closure of said first limit switch means, closure of said third limit switch means, closure of said fifth limit switch means to actuate said second electromagnetically actuated means, and appearance of said output signal from said first circuit means; third circuit means responsive to simultaneous closure of said first and third limit switch means, and to appearance of said output signals having said first characteristic from said first bistable means to actuate said first electromagnetically actuable means; fourth circuit means responsive to closure of said second and seventh limit switch means for deactuating said first electromagnetically actuable means; time delay means responsive to a continuing output signal from said third circuit means to cut off said continuing output signal from said second bistable means.

3. A control system for a cyclically operating machine tool for inserting a predetermined number of work objects in a receptacle, said receptacle being indexable to successive positions so that a reciprocating insertion member can repetitively insert said objects in said receptacle; first electromagnetically actuable means for actuating said insertion member; second electromagnetically actuated means for indexing said receptacle from one to another of said successive positions; first limit switch means adapted to be closed when said first electromagnetically actuated means is in its non-actuated position; second limit switch means adapted to be actuated when said first electromagnetically actuated means is in its actuated position; third limit switch means adapted to be operated when a work object is in said receptacle and over said third switch means; fourth limit switch means adapted to be closed when said second electromagnetically actuated means is in its non-actuated position; fifth limit switch means adapted to be closed when a receptacle supporting member has moved said receptacle to a position suitable for insertion of said work objects; sixth limit switch means adapted to be closed when said predetermined number of work objects have been inserted in said receptacle; first manually actuable means for producing an initiating signal; means including second manually actuable means for producing a stop signal; third electromagnetically actuated means for actuating said receptacle supporting member to move said receptacle to said position suitable for insertion of work objects; fourth electromagnetically actuated means for retracting said receptacle supporting member from said position; second manually actuable switch means for producing an output signal; first and second bistable means responsive to said initiating signal of said first manually actuated means for generating continuing output signals having a first characteristic, said first bistable means being responsive to said stop signal to generate a continuing output signal having a second characteristic; first circuit means responsive to simultaneous signals from said first and second bistable means for generating an output signal to actuate said third electromagnetically actuated means; second circuit means responsive to simultaneous closure of said first limit switch means, closure of said third limit switch means, closure of said fifth limit switch means to actuate said second electromagnetically actuated means, and appearance of said output from said first circuit means; third circuit means responsive to simultaneous closure of said first and third limit switch means, and to appearance of said output signals having said first characteristic from said first bistable means to actuate said first electromagnetically actuable means; fourth circuit means responsive to closure of said second limit switch means for deactuating said first electromagnetically actuable means; time delay means responsive to a continuing output signal from said third circuit means to cut off said continuing output signal from said second bistable means; fifth circuit means responsive to simultaneous appearance of said output signal having said second characteristic from said first bistable means, closure of said fifth limit switch means and closure of said second manually actuable switch means for actuating said electromagnetically actuated means.

4. A control system for a cyclically operating machine tool for inserting a predetermined number of work objects in a receptacle, said receptacle being indexable to successive positions so that a reciprocating insertion member can repetitively insert said objects in said receptacle, each of said objects having a flange adapted to project through slots in said receptacle, each slot corresponding to one of said positions; first electromagnetically actuable means for actuating said insertion member; second electromagnetically actuated means for indexing said receptacle from one to another of said successive positions; first limit switch means adapted to be closed when said first electromagnetically actuated means is in its non-actuated position; second limit switch means adapted to be actuated when said first electromagnetically actuated means is in its actuated position; third limit switch means adapted to be operated when a work object is in said receptacle and over said third switch means; fourth limit switch means adapted to be closed when said second electromagnetically actuated means is in its non-actuated position; fifth limit switch means adapted to be closed when a receptacle supporting member has moved said receptacle to a position suitable for insertion of said work objects; sixth limit switch means adapted to be closed when said predetermined number of work objects have been inserted in said receptacle; seventh limit switch means adapted to be closed when a flange projects through a slot by insertion of a work object in said receptacle; first manually actuable means for producing an initiating signal; means including second manually actuable means for producing a stop signal; third electromagnetically actuated means for actuating said receptacle supporting member to move said receptacle to said position suitable for insertion of work objects; fourth electromagnetically actuated means for retracting said receptacle supporting member from said position; second manually actuable switch means for producing an output signal; first and second bistable means responsive to said initiating signal of said first manually actuated means for generating continuing output signals having a first characteristic, said first bistable means being responsive to said stop signal to generate a continuing output signal having a second characteristic; first circuit means responsive to simultaneous signals from said first and second bistable means for generating an output signal to actuate said third electromagnetically actuated means; second circuit means responsive to simultaneous closure of said first limit switch means, closure of said third limit switch means, closure of said fifth limit switch means to actuate said second electromagnetically actuated means, and appearance of said output signal from said first circuit means; third circuit means responsive to simultaneous closure of said first and third limit switch means, and to appearance of said output signals having said first characteristic from said first bistable means to actuate said first electromagnetically actuable means; fourth circuit means responsive to closure of said second and seventh limit switch means for deactuating said first electromagnetically actuable means; time delay means responsive to a continuing output signal from said third circuit means to cut off said continuing output signal from said second bistable means; fifth circuit means responsive to simultaneous appearance of said output signal having said second characteristic from said first bistable means, closure of said fifth limit switch means and closure of said second manually actuable switch means for actuating said electromagnetically actuated means.

5. A control system for a cyclically operating machine tool for inserting a predetermined number of work objects in a receptacle, said receptacle being indexable to successive positions so that a reciprocating insertion member can repetitively insert said objects in said receptacle; first electromagnetically actuable means for actuating said insertion member; second electromagnetically actuated means for indexing said receptacle from one to another of said successive positions; first limit switch means adapted to be closed when said first electromagnetically actuated means is in its non-actuated position; second limit switch means adapted to be actuated when said first electromagnetically actuated means is in its actuated position; third limit switch means adapted to be operated when a work object is in said receptacle and over said third switch means; fourth limit switch means adapted to be closed when said second electromagnetically actuated means is in its non-actuated position; fifth limit switch means adapted to be closed when a receptacle supporting member has moved said receptacle to a position suitable for insertion of said work objects; sixth limit switch means adapted to be closed when said predetermined number of work objects have been inserted in said receptacle; first manually actuable means for producing an initiating signal; means including second manually actuable means for producing a stop signal; third manually actuable switch means and fourth manually actuable switch means having first normally open contact means and second normally closed contact means; third electromagnetically actuated means for actuating said receptacle supporting member to move said receptacle to said position suitable for insertion of work objects; fourth electromagnetically actuated means for retracting said receptacle supporting member from said position; second manually actuable switch means for producing an output signal; first and second bistable means responsive to said initiating signal of said first manually actuated means for generating continuing output signals having a first characteristic, said first bistable means being responsive to said stop signal to generate a continuing output signal having a second characteristic; first circuit means responsive to simultaneous signals from said first and second bistable means for generating an output signal to actuate said third electromagnetically actuated means; second circuit means responsive to simultaneous closure of said first limit switch means, closure of said third limit switch means, closure of said fifth limit switch means to actuate said second electromagnetically actuated means, and appearance of said output signal from said first circuit means; third circuit means responsive to simultaneous closure of said first and third limit switch means, and to appearance of said output signals having said first characteristic from said first bistable means to actuate said first electromagnetically actuable means; fourth circuit means responsive to closure of said second limit switch means for deactuating said first electromagnetically actuable means; time delay means responsive to a continuing output signal from said third circuit means to cut off said continuing output signal from said second bistable means; fifth circuit means responsive to simultaneous appearance of said output signal having said second characteristic from said first bistable means, closure of said fifth limit switch means and closure of said second manually actuable switch means for actuating said electromagnetically actuated means; sixth circuit means responsive to simultaneous appearance of said output signal having said second characteristic from said first bistable means and closure of said first normally open contact means to actuate said first electromagnetically actuated means; seventh circuit means responsive to simultaneous appearance of said output signal having said second characteristic from said first bistable means and actuation of said third normally actuable switch means to actuate said fourth electromagnetically actuated means.

6. A control system as set forth in claim 1, wherein each of said first and second bistable means comprises bistable magnetic amplifier means, the continuing output signals from having a first characteristic are half-wave rectified signals having one phase, and the continuing output signals having a second characteristic are half-wave rectified signals having the opposite phase to said one phase.

7. A control system as set forth in claim 1, wherein each of said first, second, third and fourth circuit means comprises a reset magnetic amplifier of the type wherein an output signal is derived over each of first alternate half cycles of an alternating current source coupled thereto when a magnetic core thereof is blocked from resetting to a level less than saturation on the half cycle of said source immediately preceding said given half cycle and means coupling a predetermined number of control signal sources to said magnetic amplifier to block resetting only when all of said predetermined number of signal sources are simultaneously generating output signals over said half cycle immediately preceding said given half cycle.

8. A control system for a cyclically operating work tool for inserting a predetermined number of work objects in a receptacle, said receptacle being indexable to successive positions so that a reciprocating insertion member can repetitively insert said objects in said receptacle, first electromagnetically generated means for actuating said insertion member, second electromagnetically actuated means for indexing said receptacle, first limit switch means for detecting the presence of said objects in said receptacle, second limit switch means for detecting the end of an indexing movement of said second electromagnetically actuated means by closure thereof; third limit switch means for detecting by closure thereof of the presence of said first electromagnetically actuated means in its non-actuated position; fourth limit switch means for detecting by closure thereof of the presence of said first electromagnetically actuated means in its fully actuated position; fifth limit switch means for detecting the presence by closure thereof of said first electromagnetically actuated means from its fully actuated position to its non-actuated position; and manually actuated means for generating an initiating signal having a first characteristic; first and second bistable means responsive to closure of said manually actuated means for generating continuing signals having a first characteristic; first circuit means responsive to simultaneous signals having said first characteristic from said first and second bistable means for generating a signal having a second characteristic; second circuit means responsive to simultaneous closure of said third limit switch means, non-closure of said first limit switch means and presence of said signal from said first circuit means for actuating said second electromagnetically actuated means; said first bistable means being responsive to opening of normally-closed manually actuable switch means to generate a signal having said second characteristic; third bistable means responsive to closure of said third limit switch means to generate a signal having said first characteristic, and to closure of said first or fourth limit switch means for removing said signal from said third bistable means; third circuit means responsive to simultaneous closure of said first limit switch means and presence of said signal from said third bistable means and said signal from said first bistable means having said second characteristic for actuating said first electromagnetically actuated means.

No references cited.